(12) United States Patent
Chen et al.

(10) Patent No.: US 12,098,783 B2
(45) Date of Patent: Sep. 24, 2024

(54) GAS FLOW CONTROL VALVE AND MOUNTING METHOD FOR GAS FLOW CONTROL VALVE

(71) Applicant: PETROCHINA COMPANY LIMITED, Beijing (CN)

(72) Inventors: Xinglong Chen, Beijing (CN); Jianguo Xu, Beijing (CN); Jiazhong Wu, Beijing (CN); Haishui Han, Beijing (CN); Na Zhang, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 160 days.

(21) Appl. No.: 17/999,722

(22) PCT Filed: May 20, 2021

(86) PCT No.: PCT/CN2021/094784
§ 371 (c)(1),
(2) Date: Mar. 9, 2023

(87) PCT Pub. No.: WO2021/238754
PCT Pub. Date: Dec. 2, 2021

(65) Prior Publication Data
US 2023/0258282 A1 Aug. 17, 2023

(30) Foreign Application Priority Data
May 25, 2020 (CN) .......................... 202010446644.9

(51) Int. Cl.
*F16K 47/08* (2006.01)
*E21B 34/02* (2006.01)
(Continued)

(52) U.S. Cl.
CPC .............. *F16K 47/08* (2013.01); *E21B 34/02* (2013.01); *E21B 43/166* (2013.01); *F16K 27/08* (2013.01); *F16L 55/02763* (2013.01)

(58) Field of Classification Search
CPC ... E21B 34/02; E21B 43/166; F16L 55/02763
See application file for complete search history.

(56) References Cited

U.S. PATENT DOCUMENTS 3,327,628 A * 6/1967 Loprest ..................... F02K 9/72
96/381
3,556,157 A * 1/1971 Eckerlin ............... A61M 39/28
251/8

(Continued)

FOREIGN PATENT DOCUMENTS

CN 101818637 A 9/2010
CN 101994501 A 3/2011
(Continued)

OTHER PUBLICATIONS

Translation CN 113719501 (Year: 2021).*
(Continued)

*Primary Examiner* — Umashankar Venkatesan
(74) *Attorney, Agent, or Firm* — Hoffman Warnick LLC

(57) ABSTRACT

A cylinder porous cylinder, a gas flow control valve, and a mounting method for the gas flow control valve. The porous cylinder (1) includes a plurality of pipe bundles filled inside the pipe. A single flow passage is formed in each of the pipe bundles, such that a seepage passage is formed inside the pipe. The inner diameter, length and permeability of the pipe bundle are determined in advance based on a Reynolds number smaller than 2300. The porous cylinder (1) is capable of implementing a stable gas flow in a gas injection channel. The valve body (21) of the gas flow control valve (2) is provided therein with a plurality of tubular passages arranged in sequence along the horizontal direction of the (Continued)

valve body. The tubular passages include a pipe flow passage (24) and a plurality of seepage passages (25). The porous cylinder (1) is mounted in each of the seepage passages (25). A plurality of connection channels (221) are provided in the valve cap. One end of each of the connection channels (221) communicates with the interior of each of the tubular passages, and the other end of each of the connection channels (221) is provided respectively with a valve stem. The opening and closing of the plurality of tubular passages are controlled by the valve stem, thus regulating the output ratio of the injected gas. In addition, a mounting method for the gas flow control valve is further provided.

10 Claims, 9 Drawing Sheets

(51) Int. Cl.
*E21B 43/16* (2006.01)
*F16K 27/08* (2006.01)
*F16L 55/027* (2006.01)

(56) References Cited

U.S. PATENT DOCUMENTS

| | | | |
|---|---|---|---|
| 5,299,453 | A | 4/1994 | Sprunt et al. |
| 5,307,830 | A * | 5/1994 | Welker ............... F16K 47/08 |
| | | | 251/118 |
| 2003/0037926 | A1 | 2/2003 | Sask |
| 2004/0123672 | A1 | 7/2004 | Wang |
| 2004/0167726 | A1 | 8/2004 | Rouss |
| 2007/0163356 | A1 | 7/2007 | Matter et al. |
| 2008/0059084 | A1 | 3/2008 | Wang et al. |
| 2009/0218000 | A1 * | 9/2009 | Pfau ................ F16L 55/02763 |
| | | | 138/40 |
| 2014/0216733 | A1 | 8/2014 | Mathiesen et al. |
| 2014/0238148 | A1 | 8/2014 | Priyadarshana et al. |
| 2020/0248838 | A1 * | 8/2020 | Anandbabu ............ F16L 58/00 |

FOREIGN PATENT DOCUMENTS

| | | | |
|---|---|---|---|
| CN | 102053054 | A | 5/2011 |
| CN | 103398747 | A | 11/2013 |
| CN | 105092446 | A | 11/2015 |
| CN | 205049188 | U | 2/2016 |
| CN | 105651574 | A | 6/2016 |
| CN | 105823517 | A | 8/2016 |
| CN | 105953848 | A | 9/2016 |
| CN | 106979918 | A | 7/2017 |
| CN | 107525746 | A | 12/2017 |
| CN | 206757417 | U | 12/2017 |
| CN | 108345322 | A | 7/2018 |
| CN | 108729874 | A | 11/2018 |
| CN | 110185407 | A | 8/2019 |
| CN | 110309611 | A | 10/2019 |
| CN | 110441205 | A | 11/2019 |
| CN | 110567858 | A | 12/2019 |
| CN | 113719501 | A * | 11/2021 |
| JP | H0863235 | A | 3/1996 |

OTHER PUBLICATIONS

PCT International Search Report for International Application No. PCT/CN2021/094784, dated Aug. 13, 2021, 4 pages.
Chen, "Handbook of Non-Standard Equipment Design," vol. 3, National Defense Industry Press, Dec. 31, 1983.
First Office Action issued on Mar. 21, 2022 for counterpart Chinese patent application No. 202010446644.9, 7 pages.
Search Report issued on Mar. 21, 2022 for counterpart Chinese patent application No. 202010446644.9, 4 pages.
Jie Chen et al., "Experimental study on seepage of leaked natural gas in soil column," Gas&Heat, 8 pages.
Study on capillary bundle model of reservoir rock, Internal anal science and technology, vol. 8, 2014.
The Supplementary search report issued on Jul. 14, 2022 for counterpart Chinese patent application No. 202010446644.9, 4 pages.
Chinese novelty search report, dated May 11, 2020, 9 pages.
International preliminary report on patentability for counterpart Chinese patent application No. PCT/CN2021/094784 mailed on Aug. 13, 2021, 5 pages.
Extended European Search Report issued on Oct. 16, 2023 for counterpart European patent application No. 21811773.7.
First Office Action and Search Report issued on Jul. 6, 2023 for counterpart Russia patent application No. 2022133669/03, 26 pages.

* cited by examiner

GAS FLOW CONTROL VALVE AND MOUNTING METHOD FOR GAS FLOW CONTROL VALVE

CROSS-REFERENCE TO RELATED APPLICATIONS

This application is a National Stage of International Application No. PCT/CN2021/094784, filed May 20, 2021, which claims priority to Chinese Patent Application No. 202010446644.9, filed May 25, 2020, both of which are hereby incorporated by reference in their entireties.

TECHNICAL FIELD

The present application relates to the technical field of oilfield development, and in particular to a gas flow control valve and a mounting method for the gas flow control valve.

BACKGROUND

The flow of gas in porous media is usually considered to conform to the condition of fluid percolation, which is theoretically expressed by Darcy's law, and the formula is as follows:

$$Q = \frac{K}{\mu} \cdot \frac{\Delta P \cdot A}{L}$$

Assuming that the porous media is a cylinder, Q represents flow rate. The flow rate in the laboratory is low, so the unit of the flow rate is usually mL/min. The flow rate in the industrial site is high, so the unit of the flow rate is usually m³/d. ΔP denotes the pressure difference between two ends of the cylinder, A denotes the cross-sectional area of the cylinder, L denotes the length of the cylinder, μ denotes gas viscosity, and K denotes the permeability of the cylinder.

Darcy's formula is generally applied to fluid seepage in the condition of porous media. In the field of reservoir physics, the permeability values calculated by the Darcy's formula are stable by measuring the permeability Kw (water-measured permeability) or Ko (oil-measured permeability) of rock (porous media) with liquid (water or oil). However, when the permeability Kg (gas-measured permeability) of rock (porous media) is measured by gas, the permeability value calculated by the Darcy's formula has obvious linear gradient under different pressure test conditions, and only values measured under low pressure conditions and corrected are determined as gas-measured permeability values for the rock. This phenomenon is traditionally considered to be caused by the "slippage effect" or "Klinkenberg effect" of the gas. In recent years, some researchers think it is related to the boundary layer and the gas viscosity as variables. Without discussing the mechanism, it can be seen that the gas permeability measured by the Darcy's formula is unstable. Therefore, the formula is only applied in parameter measurement and reservoir fluid percolation condition, and cannot be used to guide a gas injection process.

At present, the gas injection technology in some areas is gradually applied in multiple types of oil reservoirs, thus higher requirements are put forward for the gas injection technology. For example, the pipe network with the same gas injection pressure supplies gas to multiple gas injection wells in the block. Therefore, a quantitative distribution method and process are required to inject the gas with different flow rates into the corresponding gas injection wells. The current situation is that a single gas injection well can achieve quantitative flow control by controlling injection pressure. The simultaneous gas injection of multiple wells depends entirely on the different permeability of the reservoir to carry out uncontrolled regulation, and the higher the permeability of the formation is, the greater its flow rate is, which is usually contrary to the gas injection design.

In the process, attempts have also been made to control the gas flow rate by controlling the opening degree of the valve, which is effective in regulating the flow rate of liquid (water/oil, etc.) and is almost ineffective in regulating the flow rate of gas. Reasons are as follows.

The flow of liquid in the pipe belongs to pipe flow, and mostly in a turbulent state in industrial application, which can be expressed by the Darcy-Weisbach Formula as follows:

$$h_f = f \frac{L}{D} \cdot \frac{U^2}{2g} \tag{1}$$

where, $h_f$ denotes head loss, L denotes length of pipe, D denotes inner diameter of the pipe 11, U denotes average velocity of fluid, f denotes a friction factor, and the friction factor reflects comprehensive properties of water viscosity and roughness of the inner surface of the pipe.

In the oil field, pipeline transportation and water/gas injection into formation are usually performed under high temperature and high pressure conditions. Taking downhole water injection as an example, the temperature is 40° C. to 90° C., the pressure is 10 MPa to 40 MPa, and the daily water injection volume is 5 m³ to 50 m³ MPa. The diameter of the pipe at the far end of the water injection pipeline is usually only 3 mm, 5 mm, 8 mm, etc., so it is feasible to control the effective diameter of the pipe by a valve. However, due to the low viscosity and low density of the gas, the diameter of the gas pipe is only 0.03 times the diameter of the water pipe under the same pressure difference (head loss), flow velocity and length conditions, i.e., the diameter of the gas pipe is 100 μm. Obviously, the use of existing valve to regulate the gas flow is not operable and does not allow for a stable gas flow. In other words, the method in the prior art is not effective in achieving a stable gas flow in the gas injection channel.

SUMMARY

In order to solve the problems in the prior art, the present application provides a gas flow control valve and a mounting method for the gas flow control valve, which can effectively realize the stable flow of the gas in the gas injection channel and play an auxiliary role in improving the application effect of the gas injection technology.

In order to solve the above technical problems, the present application provides the following technical solution.

In a first aspect, the present application provides a gas flow control valve including a tubular valve body, two valve caps respectively provided at both ends of the valve body, and two flanges respectively provided at both ends of the valve body, wherein one side of the flange is communicated with the gas injection channel, and the other side of the flange is connected to the valve cap; the valve body is provided therein with a plurality of tubular passages arranged in sequence along the horizontal direction of the valve body, and the tubular passages includes a pipe flow passage and a plurality of mounting passages; a porous cylinder with a porous structure is mounted in each of the mounting passages, and an interior of the porous cylinder forms a seepage passage for stable seepage flow of gas, wherein a Reynolds number for characterizing the flow state of the gas flowing through the seepage passage is a positive number smaller than 2300; a plurality of connection channels are provided in the valve cap, one end of each of the connection channels communicates with an interior of each of the tubular passages, and the other end of each of the connection channels is provided respectively with a valve stem, such that the gas in the gas injection channel flows through the connection channel corresponding to the valve stem in an open state, and flows into the tubular passage communicating with the connection channel.

Further, there are two porous cylinders, an interior of one of which forms a first seepage passage and an interior of the other of which forms a second seepage passage.

Further, the valve body is provided therein with a first mounting passage and a second mounting passage, and the two porous cylinders are mounted in the first mounting passage and the second mounting passage, respectively; a communication hole is provided between the first mounting passage and the second mounting passage; a pressure measuring hole is provided between the second mounting passage and the valve body, and a pressurization and depressurization hole is provided between the second mounting passage and the valve body.

Further, the gas flow control valve includes a pressure gauge and a pressurizer which are provided on an outer surface of the valve body; the pressure gauge is connected to the pressure measuring hole, and the pressurizer is connected to the pressurization and depressurization hole.

Further, a sealing ring is provided at the connection between a port of the valve body and the valve cap.

Further, a rubber cylinder arranged in the length direction of the mounting passage is provided in the mounting passage, and a sealing ring is provided between the rubber cylinder and inner surfaces of both ports of the mounting passage, such that a confining pressure annulus is formed between the rubber cylinder and an inner surface of the mounting passage; the rubber cylinder is provided therein with supporting short pipes respectively close to two ports of the mounting passage; the porous cylinder is connected between the two supporting short pipes.

Further, a sealing circle is provided on a side of the sealing ring that is close to the port of the mounting passage.

In a second aspect, the present application provides a mounting method for the gas flow control valve, including:
  mounting the porous cylinders in mounting passages of the flow control valve, respectively;
  mounting valve caps provided with the flanges in advance on both sides of the valve body respectively; and
  fixedly connecting the flanges with the gas injection channel.

Further, mounting the porous cylinders in mounting passages of the flow control valve, respectively, includes:
  mounting each of the porous cylinders in a rubber cylinder;
  providing supporting short pipes in gaps between the porous cylinders and ports of the rubber cylinder;
  mounting sealing rings on both sides of the rubber cylinder, respectively; and
  mounting the rubber cylinder into the mounting passage.

Further, after mounting valve caps provided with the flanges in advance on both sides of the valve body respectively, the mounting method further includes:
  providing a pressure gauge for measuring the mounting passage and a pressurizer for pressurizing or depressurizing the plurality of mounting passages on an outer surface of the valve body;
  controlling the pressurizer to apply pressure such that gas is filled in a confining pressure annulus formed between the rubber cylinder and the inner surface of the mounting passage.

As can be seen from the above technical solution, the present application provides a gas flow control valve and a mounting method for the gas flow control valve. By understanding the method for characterizing the stability of gas seepage at first and using this method to design porous cylinders, it is possible to effectively realize the stable flow of the gas in the gas injection channel and play an auxiliary role in improving the application effect of the gas injection technology.

BRIEF DESCRIPTION OF THE DRAWINGS

For a clearer illustration of technical features in the embodiments of the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts.

FIG. 2 (b) is a schematic cross-sectional view of the pipeline of the water injection well pipeline.

FIG. 3 (b) is a schematic cross-sectional view of the pipeline with pipe bundles.

FIG. 4 (b) is a schematic cross-sectional view of a porous cylinder provided in an embodiment of the present application.

FIG. 5 (b) is a schematic cross-sectional view A-A' of a gas flow control valve provided in an embodiment of the present application.

FIG. 5 (c) is a schematic cross-sectional view B-B' of a gas flow control valve provided in an embodiment of the present application.

FIG. 5 (d) is a schematic diagram of a gas flow transition process from an unstable state to a stable seepage state according to an embodiment of the present application.

FIG. 9 (b) is a schematic cross-sectional view C-C' of a valve body in a gas flow control valve provided in an embodiment of the present application.

Figure 1:
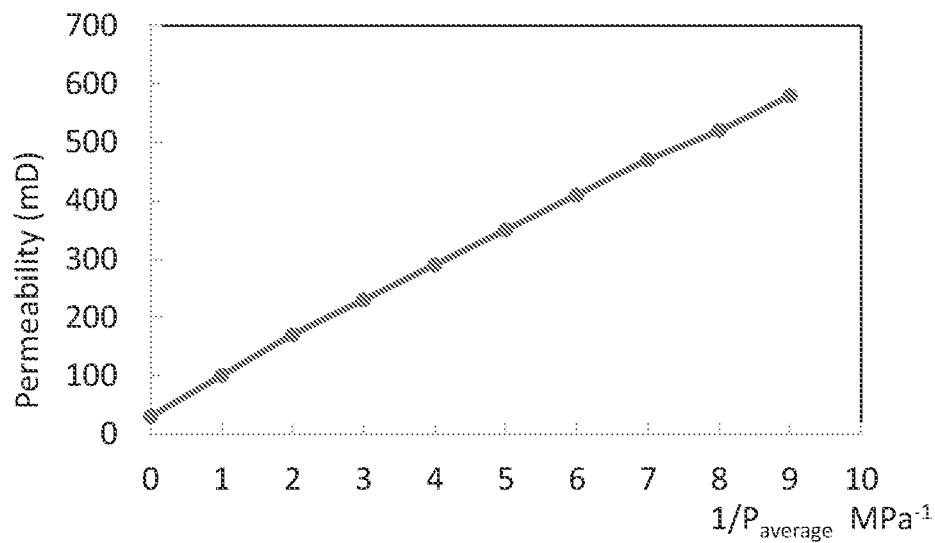
FIG. 1 is a schematic diagram of the relationship between air permeability and pressure of rock.

REFERENCE SIGNS 101. pipe wall;
102. flow channel;
103. pore area;
104. fluidized transition region;
1. porous cylinder;
   11. pipe;
   12. pipe bundle;
   13. single flow passage;
2. gas flow control valve;
   21. valve body;
   22. valve cap;
      221. connection channel;
      222. valve stem;
      223. sealing surface;
      224. pipe connection surface;
      225. O-shaped ring groove;
   23. flange;
   24. pipe flow passage;
   25. k12, k22, k13, k23, mounting passage;
      251. first mounting passage;
      252. second mounting passage;
      253. communication hole;
      254. pressure measuring hole;
      255. pressurization and depressurization hole;
      256. rubber cylinder;
      257. sealing ring;
      258. confining pressure annulus;
      259. supporting short pipe;
   26. pressure gauge;
   27. pressurizer;
   28. O-shaped ring;
3. gas injection channel;
   t11. first channel valve;
   t21. second channel valve.

DETAILED DESCRIPTION

For a clearer understanding of the objectives, technical features and effects of the embodiments of the present disclosure, a clear and complete description of the embodiments of the present disclosure will be set forth with reference to the drawings. Obviously, the described embodiments are only a part, rather than all, of the embodiments of the present disclosure. All other embodiments derived by persons skilled in the art from the embodiments of the present disclosure without making inventive efforts shall fall within the scope of the present disclosure.

Embodiments of the present disclosure provide a method for characterizing the stability of gas seepage, by which the limits of geometric parameters of porous media under different temperature and pressure conditions are determined, which provides a theoretical basis for application, and effectively realizes stable gas flow in the gas injection channel, thus playing an auxiliary role in improving the application effect of the gas injection technology.

Embodiments of the present disclosure further provide a porous cylinder. Firstly, the method for characterizing the stability of gas seepage is understood, and then the porous cylinder is designed by the method, so as to be able to effectively realize the stable gas flow in the gas injection channel, thereby playing an auxiliary role in improving the application effect of the gas injection technology.

Embodiments of the present disclosure further provide a gas flow control valve and a mounting method thereof, which can effectively realize the stable gas flow in the gas injection channel, enable stable gas flow, and can implement flow regulation in a certain range, thus effectively controlling the gas flow rate in the gas injection channel. The gas flow control valve capable of adjusting the flow rate is convenient to use and easy to adjust.

In order to solve the problem of gas flow control, in the present application, by understanding the method for characterizing the stability of gas seepage at first, a gas flow control valve with stable gas flow condition is designed by the method, so as to play an auxiliary role in improving the application effect of the gas injection technology.

The purpose of this application includes the following four aspects:

1. A method for characterizing the stability of gas seepage is provided.
2. The limits of geometric parameters of porous media under different temperature and pressure conditions are determined by the method for characterizing the stability of gas seepage, which provides a theoretical basis for application.
3. A gas flow control valve 2, which enables stable gas flow and can implement flow regulation in a certain range, is provided.
4. The gas flow control valve is convenient to use and easy to adjust.

In the present disclosure, the Reynolds number is used as a standard to establish the method for characterizing stable gas seepage, and determine the adjustment parameters to realize the feasibility of application.

(I) Method and Principle

(1) A Method for Characterizing the Stability of Gas Seepage

The "slippage effect" or "Klinkenberg effect" of the gas is expressed as below: the gas permeability measured with the same rock and the same gas at different average pressures is different. There is a good linear relationship between the permeability and the reciprocal of the evaluation pressure. Taking the measurement of the air permeability of a rock sample as an example, referring to FIG. 1, $P_{average}$ is an average of the inlet pressure and the outlet pressure. The air permeability value corresponding to the original position in FIG. 1 denotes the liquid equivalent permeability.

The porous media flow state can also be regarded as the state when the pipe gradually shrinks to the level of a tiny pore, and a pipe flow equation is first used for analysis as below.

When $\tau \neq 0$ and $\mu \neq 0$, the Bernoulli equation for fluid pipe flow is as follows:

$$z + \frac{u^2}{2g} + \frac{p}{\rho g} + H_f = C$$

where, the first item denotes a position head; the second item denotes a dynamic pressure head; the third item denotes a static pressure head; the fourth item denotes the head loss; and the sum of the four items is a constant.

The flow state of pipe flow is usually characterized by Reynolds number, which is a dimensionless number.

$$R_e = \frac{\rho v d}{\mu}$$

where, v, $\rho$ and $\mu$ respectively denote the flow rate, density, and viscosity coefficient of the fluid; d denotes the characteristic length, which is the equivalent diameter of the pipe in the case of a round pipe, d denotes. The Reynolds number is usually used as a basis for judging the flow characteristics, and in pipe flow, Re<2300 denotes laminar flow, Re denotes transitional state in the range of 2300~4000, and Re>4000 denotes turbulent flow.

In the flow equation, if the Reynolds number is small, the viscous force is the main factor, and the pressure term is balanced mainly with the viscous force term; if the Reynolds number is large, the viscous force term becomes the minor factor, and the pressure term is balanced mainly with the inertial force term. When the Reynolds number is small, resistance is proportional to speed, viscosity, and characteristic length. When the Reynolds number is large, resistance is substantially proportional to the square of velocity, the square of the density, and the square of the characteristic length.

Using the actual single pipe test, the flow conditions in the pipes with different diameters are illustrated. Under the condition of the same pressure difference and temperature, water, oil, and nitrogen are used for comparison. With reference to Table 1 for basic parameters, where the flow rate of water and oil is 1 mL/min (this value is the velocity often used in core experiments), and the flow rate of nitrogen corresponding to the same condition experiment is about 100 mL/min.

TABLE 1

| Basic parameters | | | |
|---|---|---|---|
| | water | oil | nitrogen |
| density (kg/m³) | 1000 | 800 | 1.16 (21° C., 1 barometric pressure) |
| viscosity (mpa · s) | 0.8 | 3 | 0.0017 |

TABLE 2

| Reynolds number values in pipes with different diameters | | | |
|---|---|---|---|
| pore | | Re | |
| diameter (μm) | water | oil | nitrogen |
| 10 | 2653.9 | 565.3 | 144658.8 |
| 100 | 265.39 | 56.53 | 14465.88 |
| 1000 | 26.539 | 5.653 | 1446.588 |

As can be seen from the results in Table 2, under a condition where the pore diameter is 100 μm, the gas flow in the pipe is still in a turbulent state, and the flow is unstable. The degree of instability increases linearly as the pipe diameter decreases. It is obvious that this does not conform to the conditions for measuring gas permeability by conventional methods. As can be seen from the liquid phase test data of conventional core permeability, the Reynolds number Re is usually smaller than 1, which is much smaller than 2300, that is, in a very stable laminar flow state. Therefore, there is a prerequisite for the test and study of permeability, that is, the flow must be in a porous media flow state, i.e., a stable laminar flow state. For gas, once the gas is flowing at high velocity, even in the porous structure, the Re value is much larger than 4000, which is unstable state and unsuitable to be described by the Darcy's formula.

The seepage is essentially using the large resistance of the porous structure to reduce the pipe flow with high-velocity and conforms to the Darcy's law, so the laminar flow is taken as the boundary of stable flow, that is, it is feasible to use Re<2300 in pipe flow as the boundary value of the seepage state.

(2) A Method for Achieving Stable Gas Seepage

After determining the above described method for characterizing the stability of gas seepage, the following procedure is performed to convert an unstable flow into a stable flow with the flow rate remaining unchanged. This can be achieved by using porous structure with tiny pores in the rock structure. The resistance can be adjusted by changing the degree of density and length of the porous structure. The degree of density is reflected by the number of pores per unit area of rock structure and the diameter of pores. Obviously, the greater the number of the pores is and the smaller the diameter of the pores is, the lower the Reynolds number Re in a single pipe is. Changing the length can also achieve the purpose of changing the resistance under the condition that the degree of density is constant. As the length and the resistance increases, the Reynolds number Re decreases, and it is known that there is a length limit value $L_{lim}$, so that the flow state becomes a stable laminar flow state.

Illustration is provided below with reference to practical examples.

Figure 2A:
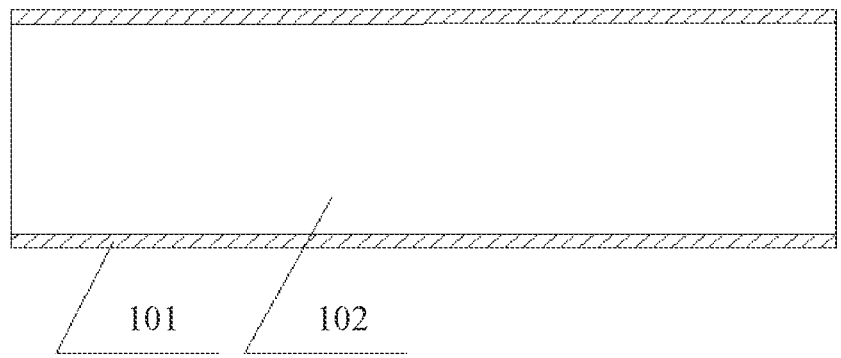
FIG. 2 (a) is a side sectional view of a pipeline of a water injection well pipeline.
Figure 2B:
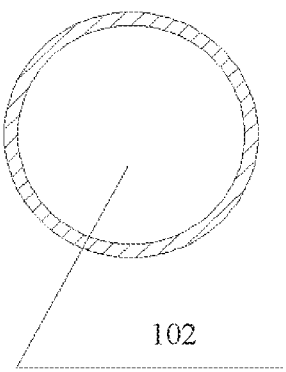

Referring to FIG. 2 (a) and FIG. 2 (b), the water injection rate of the water injection well is 20 m³/d, a flow channel 102 is formed inside the pipe wall 101 of the pipeline, the inner diameter of the pipeline is 3 cm, and the water flow Re is about 12,000, which is an unstable state; under the same conditions, the airflow Re is about 670,000, which is a serious unstable state.

Figure 3A:
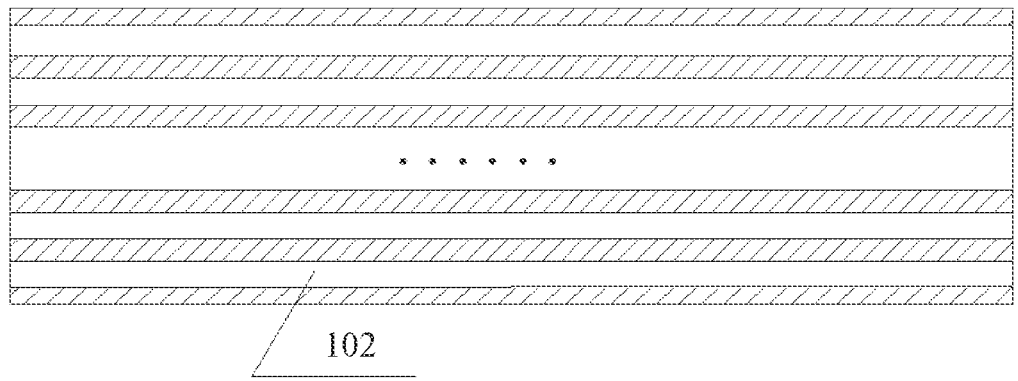
FIG. 3 (a) is a side sectional view of the pipeline with pipe bundles.
Figure 3B:
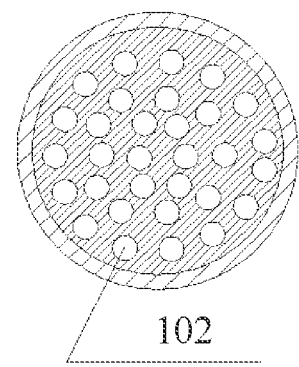

Referring to FIG. 3 (a) and FIG. 3 (b), under the condition of same area, the pipe bundles with an inner diameter of 3 mm are used, and if the flow rate is calculated in the unit of 100 pieces of pipe bundles, the flow rate of a single pipe bundle is reduced by 100 times, then the flow rate Re is about 67,000, and the unstable state is reduced, but is still serious.

Based on this principle, the pipe bundles with an inner diameter of 30 μm are used, and there are 106 pieces of pipe bundles in the same area, at this time, the air flow Re is about 670, which conforms to the stable laminar flow state. By reducing the pipe diameter and increasing the number of pipe bundles in a manner that maintains the same cross-sectional area of the flow channels, it is apparent that the outer diameter of the overall structure will increase.

Figure 4A:
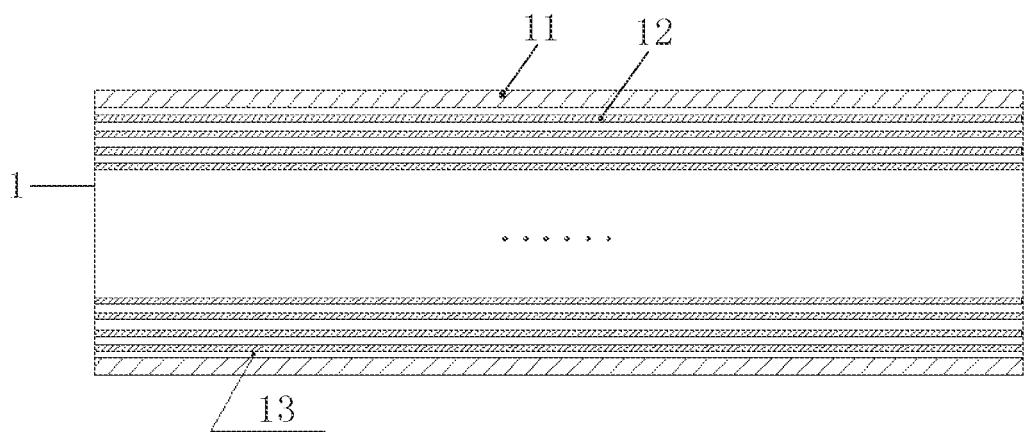
FIG. 4 (a) is a side sectional view of a porous cylinder provided in an embodiment of the present application.
Figure 4B:
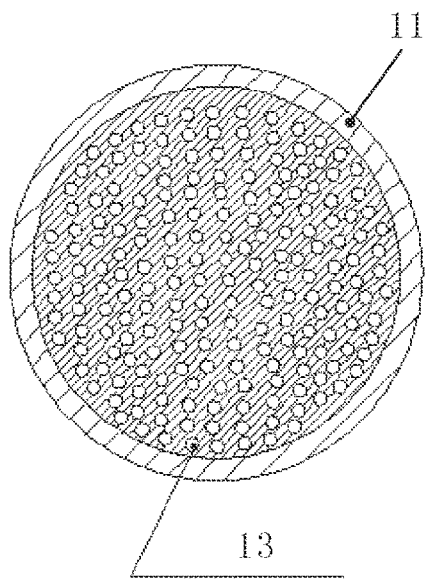
Figure 5A:
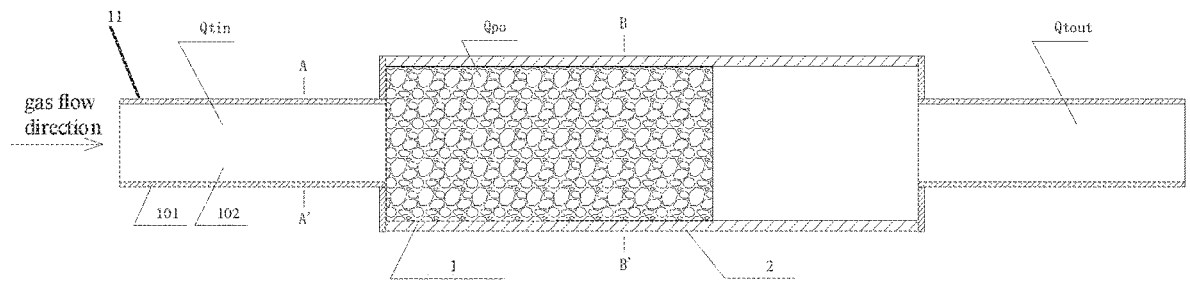
FIG. 5 (a) is a side sectional view of a gas flow control valve provided in an embodiment of the present application that is connected to a gas injection channel.
Figure 5B:
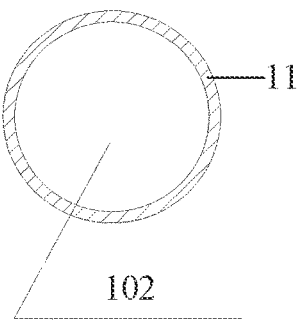
Figure 5C:
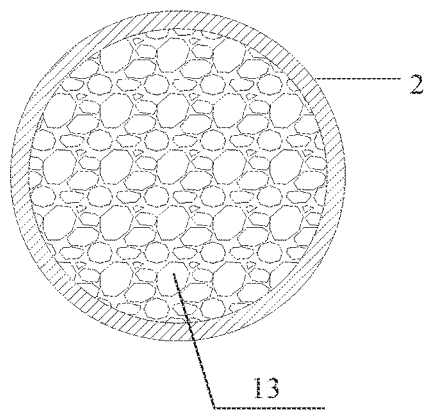
Figure 5D:
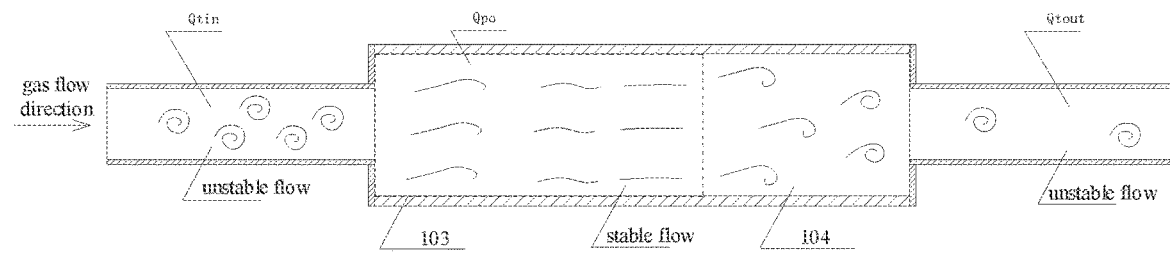

Based on this, in order to effectively realize the stable gas flow in the gas injection channel and play an auxiliary role in improving the application effect of the gas injection technology, an embodiment of the present application provides a porous cylinder. Referring to FIG. 4 (a) and FIG. 4 (b), the porous cylinder 1 specifically including: a pipe 11 for being provided within a gas injection channel and a plurality of pipe bundles 12 filled inside the pipe 11 along a length direction of the pipe 11. A single flow passage 13 is formed in each of the pipe bundles 12, such that a mounting passage 25 is formed within the pipe 11. The inner diameter, length and permeability of the pipe bundle 12 are determined in advance based on a Reynolds number for characterizing the flow state of the gas flowing through the pipe 11, and the Reynolds number is a positive number smaller than 2300.

Specifically, the inner diameter, length and permeability of the pipe bundle 12 are determined in advance based on a Reynolds number for characterizing the flow state of the gas flowing through the pipe 11 in a specific manner referring to the above described method for characterizing the stability of gas seepage. The permeability is reflected by the number of pores per unit area and the diameter of pores, and obviously the greater the number of the pores is and the smaller the pore diameter is, the lower the Reynolds number Re in a single pipe is. Changing the length of the pipe bundle 12 can also achieve the purpose of changing the resistance under the condition that the permeability is constant. As the length increases, the resistance increases, and then the Reynolds number Re decreases.

If the inner diameter and the permeability of the pipe bundle 12 are preset fixed values, a length limit value of the pipe bundle 12 is obtained based on the Reynolds number so that the flow state of the gas flowing through the pipe 11 is in a laminar flow state. Therefore, the length limit value $L_{lim}$ of the pipe bundle 12 can be determined, and the flow state can be set to a stable laminar flow state.

From the above analysis, it is known that the transformation from the unstable state to the stable seepage state under the condition of constant flow can be realized by using the porous structure. The pore diameter of 30 μm is still a high permeability core for the porosity of rock, and there is a large room for further reduction.

The pore diameter is analyzed above, and the length limit value $L_{lim}$ of the porous media (porous cylinder) is related to the specific pressure value, pressure difference and pore density (permeability), however, the actual test adjustment is very simple.

Referring to FIG. 5 (a), a gas flow control valve 2 is provided in the middle of the pipe 11. The core component of the gas flow control valve 2 is the porous cylinder 1, which is a porous structure. The pore density (permeability) of the porous cylinder 1 needs to be specifically designed, and the length of the porous cylinder 1 is not lower than the limit value $L_{lim}$. The flow rate of the gas flowing into the pipe 11 is $Q_{tin}$, the flow rate of the gas flowing through the porous structure is $Q_{po}$, and the flow rate of the gas flowing out of the pipe 11 is $Q_{tout}$, which are obviously equal to each other. FIG. 5 (b) is a section A-A' of the pipe 11 connected to the gas flow control valve 2 illustrated in FIG. 5 (a), FIG. 5 (c) is a section B-B' of the pipe 11 connected to the gas flow control valve 2 illustrated in FIG. 5 (a), in which a single flow passage 13 is formed, and the gas flow transition process from an unstable state to a stable seepage state can be seen by referring to FIG. 5 (d).

FIG. 5 (b) and FIG. 5 (c) show cross-sectional views at the position of the pipe 11 and the position of the porous cylinder 1, respectively, with equal flowable areas on the cross sections, which can be expressed as:

$$S_{A\text{-}A'} = S_{B\text{-}B'} \cdot S_g$$

where, $S_{A\text{-}A'}$ denotes the inner diameter section of the flow channel; $S_{B\text{-}B'}$ denotes the inner diameter section of the gas flow control valve 2; $S_g$ denotes the gas saturation of the porous cylinder 1.

The gas flow direction in FIG. 5 (d) is from the left pipe towards the right pipe. The gas in the left pipe is in an unstable flow state. After the gas enters the pore area 103 of the control valve, the flow state of the gas changes gradually to become a stable flow state, and maintains the stable flow state over an effective length. After enters a flow state transition zone 104 of the control valve, the gas gradually changes from the stable flow state to become unstable, and changes to the unstable flow state again after flowing for a certain distance in the right pipe.

As can be seen from the above analysis, the flow state is stabilized in the pore area of the gas flow control valve 2. This method provides theoretical guidance for the quantitative distribution of gas flow.

(II) Gas Flow Control Valve and Operation Principle Thereof

Figure 6:
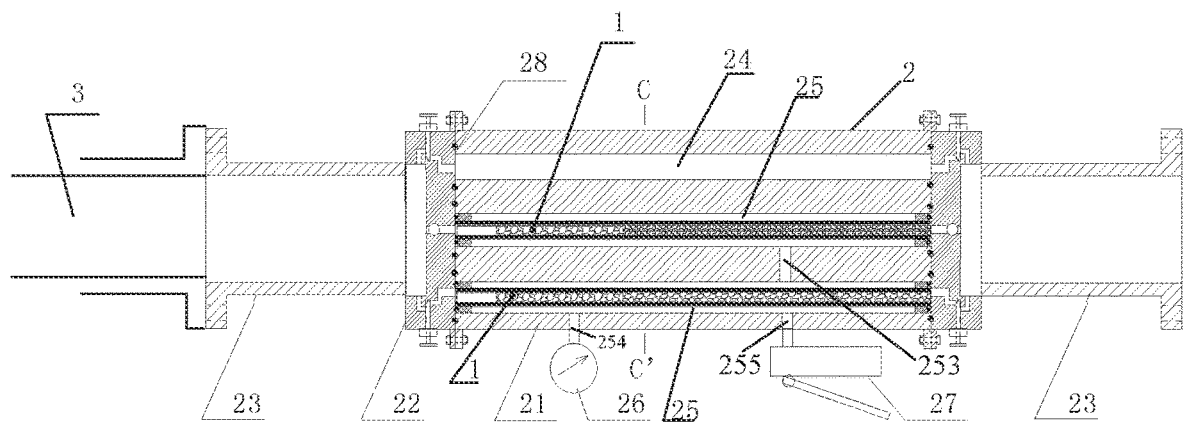
FIG. 6 is a side cross-sectional view of a gas flow control valve provided in an embodiment of the present application.

Based on the above described method for achieving stable gas seepage, in order to be able to implement flow regulation in a certain range, and in addition, to effectively control the gas flow rate in the gas injection channel, an embodiment of the present application provides a gas flow control valve 2. Referring to FIG. 6, the gas flow control valve 2 specifically includes: a tubular valve body 21, two valve caps 22 respectively provided at both ends of the valve body 21, and two flanges 23 respectively provided at both ends of the valve body 21. One side of each flange 23 is communicated with the gas injection channel 3, and the other side of each flange 23 is connected to the valve cap 22. The valve body 21 is provided therein with a plurality of tubular passages arranged in sequence along the horizontal direction of the valve body 21. The tubular passages include a pipe flow passage 24 and a plurality of mounting passages 25. The porous cylinder 1 is mounted in each of the mounting passages 25.

In FIG. 6, a three-way structure consisting of one pipe flow passage 24 and two mounting passages 25 is taken as an example. However, in practical application, the number of passages may be increased or decreased according to actual circumstances, and the gas flow control valve 2 may be included. The gas flow control valve 2 includes a flange 23, a valve cap 22, a valve body 21, and a pressurizer 27. The first layer of the valve body 21 is of a channel type in a pipe flow manner, and the second and third layers are provided with porous cylinders to regulate the stable flow of the gas. In addition, the gas flow control valve 2 may also be a gas flow control valve with a five-hole structure.

In order to further improve the sealing property of the connection between the valve cap 22 and the valve body 21, a sealing circle is provided at the connection between a port of the valve body 21 and the valve cap 22, and the sealing circle may be an O-shaped ring 28.

The gas flow control valve 2 further specifically includes a pressure gauge 26 and a pressurizer 27 which are arranged on the outer surface of the valve body 21. The pressure gauge 26 is connected to the pressure measuring hole 254, and the pressurizer 27 is connected to the pressurization and depressurization hole 255.

(1) Structure

① Flange 23

Figure 7:
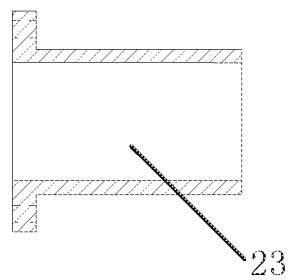
FIG. 7 is a side cross-sectional view of a flange in a gas flow control valve provided in an embodiment of the present application.

One side of the flange 23 is connected to the gas injection channel 3, and the other side of the flange 23 is connected to the valve cap 22. In on-site application of an oil field, the flange 23 needs to be welded to the valve cap 22. The flange 23 is of a conventional structure, referring to FIG. 7.

② Valve Cap 22

Figure 8A:
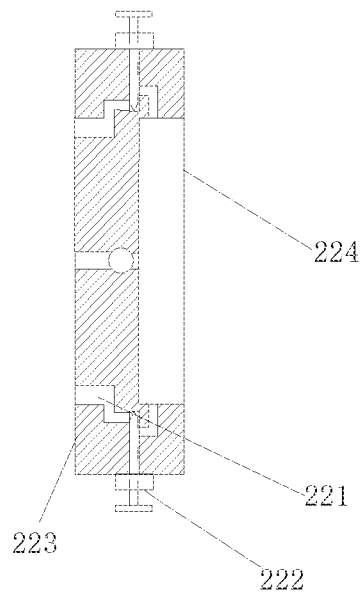
FIG. 8 (a) is a side cross-sectional view of a valve cap in a gas flow control valve provided in an embodiment of the FIG. 8 (b) is a schematic cross-sectional view of a valve cap in a gas flow control valve provided in an embodiment of the present application.
Figure 8B:
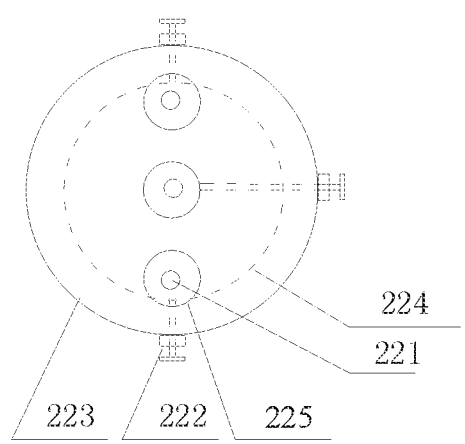

Referring to FIG. 8 (a) and FIG. 8 (b), a plurality of connection channels 221 are provided in the valve cap 22, one end of each of the connection channels 221 communicates with the interior of each of the tubular passages, and the other end of each of the connection channels 221 is provided respectively with a valve stem 222, such that the gas in the gas injection channel 3 flows through the connection channel 221 corresponding to the valve stem 222 in an open state, and then flows into the tubular passage communicating with the connection channel 221. A sealing surface 223 on one side of the vacap 22 is used to connect to the valve body 21, and a pipe connecting surface 224 on the other side of the valve cap 22 is used to connect to the gas injection channel 3. An O-shaped ring groove 225 is provided at the connection channel 221.

③ Valve Body 21

Figure 9A:
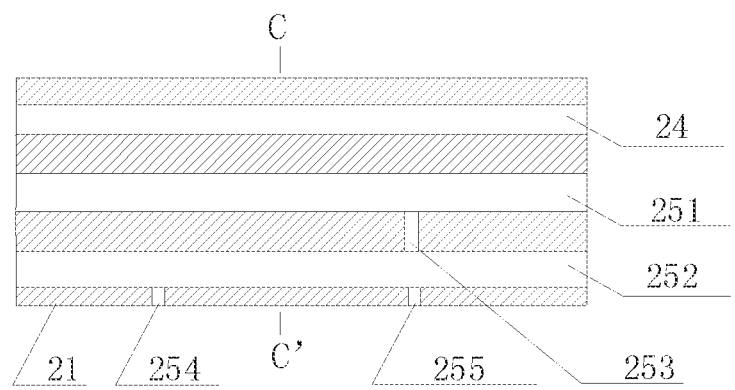
FIG. 9 (a) is a side cross-sectional view of a valve body in a gas flow control valve provided in an embodiment of the present application.
Figure 9B:
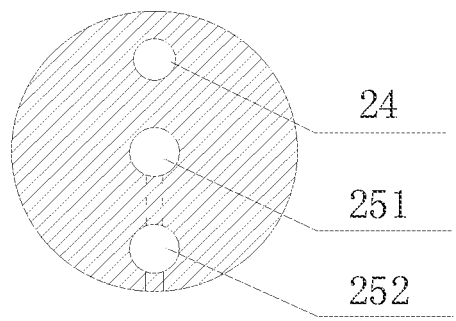

There are two porous cylinders 1, the interior of one of which forms a first seepage passage and the interior of the other of which forms a second seepage passage. In other words, the interior of the valve body 21 is provided with three passages, namely, a pipe flow passage 24, a first mounting passage 251, and a second mounting passage 252 in this order. Referring to FIG. 9 (a) and FIG. 9 (b), the mounting passages 25 communicate with each other, and a pressure measuring hole 254 and a pressurization and depressurization hole 255 are provided at the bottom of the second flow passage 252.

A communication hole 253 is provided between the first mounting passage 251 and the second mounting passage 252. The pressure measuring hole 254 is provided between the second mounting passage 252 and the valve body 21. The pressurization and depressurization hole 255 is provided between the second mounting passage 252 and the valve body 21.

Figure 10:
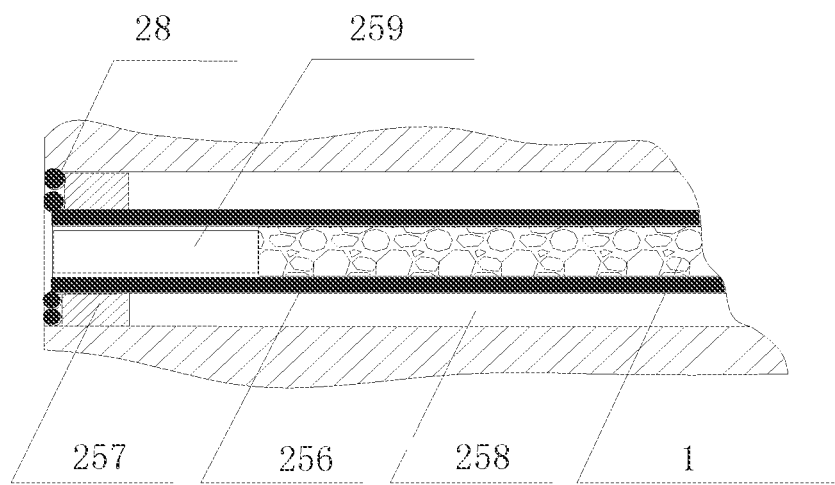
FIG. 10 is a side cross-sectional view of a mounting passage in a gas flow control valve provided in an embodiment of the present application.

Referring to FIG. 10, a rubber cylinder 256 arranged in the length direction of the mounting passage 25 is provided in the mounting passage 25, and a sealing ring 257 is provided between the rubber cylinder 256 and the inner surface of each of the two ports of the mounting passage 25, such that a confining pressure annulus 258 is formed between the rubber cylinder 256 and the inner surface of the mounting passage 25. The rubber cylinder 256 is provided therein with supporting short pipes 259 respectively close to two ports of the mounting passage 25, and the porous cylinder 1 is connected between the two supporting short pipes 259.

A sealing circle is provided on a side of the sealing ring 257 that is close to the port of the mounting passage 25, and the sealing circle may be an O-shaped ring 28.

According to the design, a porous cylinder with a certain permeability is installed in the mounting passage 25 to realize stable seepage flow in the passage. Referring to FIG. 10, the porous cylinder is mounted inside the rubber cylinder 256 and, if the length of the cylinder is smaller than that of the channel, the remaining portion of the channel is filled by the supporting short pipe 259 made of steel. Sealing rings 257 are mounted at both ends of the mounted rubber cylinder 256. Grooves for mounting O-shaped rings are provided on the inner and outer sides of the sealing ring 257, and the O-shaped rings 28 play the role of sealing on both sides of the sealing ring 257 under pressure.

There is a small confining pressure annulus 258 between the rubber cylinder 256 and the inner surface of the channel, and the annulus is pressurized by the pressurizer 27 so that the sealing ring 257 seals against the end face of the valve cap 22 and the gas flows only inside the rubber cylinder 256.

The porous cylinder is made of metal nanoparticles, with good pore size and distribution uniformity, and good pressure resistance (working pressure can reach 40 MPa). The description parameters of the porous cylinder are permeability, diameter and length.

④ Pressurizer 27

The pressurizer 27 is similar in structure to a hydraulic jack and can be manually operated to pressurize the confining pressure annulus 258. The details will not be repeated.

In addition, in a specific experimental test, an experimental test device may be provided, including: three gas flow control valves 2, three gas flow meters, a nitrogen tank, a pressure gauge 26 and several connecting pipe valve members. The gas flow control valve 2 for testing is internally provided with a group of porous cylinders 1, and the flow function is that the gas flow control valve 2 can be tested individually or in combination with three gas flow control valves 2.

(2) Working Process

Hereinafter the characteristics of the present application are described in conjunction with the actual conditions at the oilfield site.

Application conditions: the maximum daily gas production of a high-pressure nitrogen compressor is 10,000 $Nm^3$/d, and the maximum output pressure is 25 MPa. The pressure is 20 to 23 MPa, and the daily gas production is 7000 to 9000 $Nm^3$/d.

There are two injection wells into which water was injected in the early stage, and gas is now required to be injected, so as to implement slug injection with one-stage water and one-stage gas. The wellhead injection pressure during water injection of Well 1# is 10 MPa, and the daily water injection volume is 30 $m^3$; the wellhead injection pressure during water injection of Well 2# is 12 MPa, and the daily water injection volume is 15 $m^3$. In the design of daily gas injection volume, it is 6,000 $Nm^3$ for Well 1# and 3,000 $Nm^3$/d for Well 2 #

(1) Conventional Method

In the prior art, common valve plate-type valves are installed in the Well 1# and Well 2#.

The gas produced by the high-pressure nitrogen compressor enters the parallel Well 1# and Well 2# through branch pipelines, and the pressure at wellheads of both wells rises.

When the pressure of the nitrogen compressor is stable (21 MPa), the wellhead pressure of the Well 1# and the Well 2# is about 21 MPa, and the pressure loss of the pipeline is small. At this time, the flow rate of the Well 1# is 8,000 Nm³/d, and the flow rate of the Well 2# is 500 Nm³/d. The method of reducing the flow rate by closing the valve of the Well 1# can not be realized for many times. When the valve is adjusted to an almost closed state, there is still no obvious improvement, and if the valve is lowered continuously, it is very easy to close the valve, resulting in pressure holding and the nitrogen compressor holding and stopping. When the valve is opened again, the flow rate reaches 8,000 Nm³/d once the valve is opened due to the influence of the valve stem pitch.

Single well injection shall be implemented on the premise that the valve adjustment is ineffective. For single well injection of the Well 1#, the pressure is 20 MPa, the flow rate is 7,500 Nm³/d, and the flow rate still can not be adjusted to realize a constant injection effect. As a result, 19 hours of continuous injection has to be performed to achieve a design of 6,000 Nm³/d, and the injection is continued for 19 hours on the second day until the injection volume of this cycle is completed.

For single well injection of the Well 2#, the pressure is 22 MPa, the flow rate is 6,000 Nm³/d. It also has to adopt the same intermittent injection method as the Well 1#, i.e. continuous injection for 10 hours per day to achieve a design of 3,000 Nm³/d. Obviously, one compressor can not satisfy the scheme of simultaneous injection of two wells, and the injection can only be carried out in turn between the two wells. The original design scheme cannot be implemented.

(2) Process and Effect of Using Stable Gas Flow Control Valve

Figure 11:
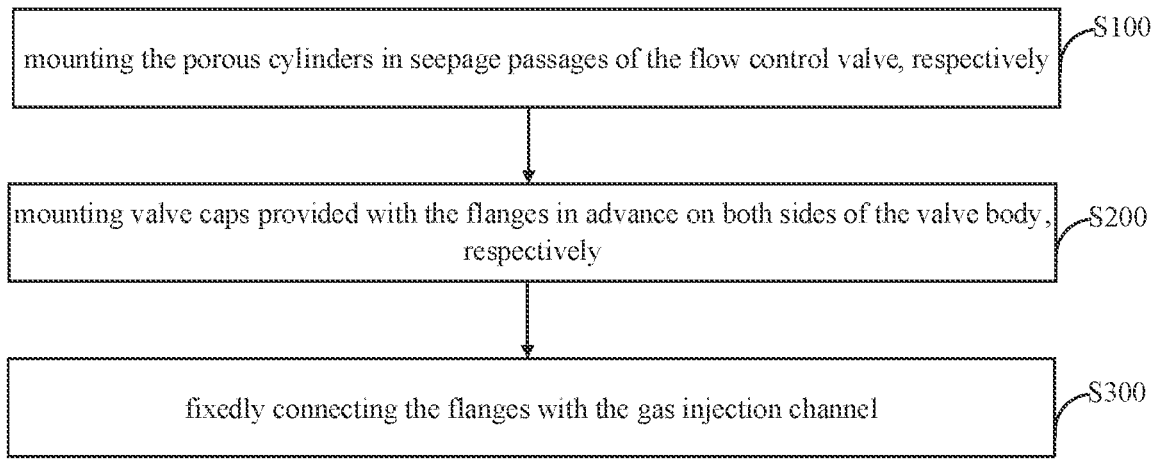
FIG. 11 is a schematic diagram of a flow chart of a method for mounting a gas flow control valve provided in an embodiment of the present application.

The embodiment of the present application further provides a mounting method for a gas flow control valve 2. Referring to FIG. 11, the mounting method for the gas flow control valve 2 specifically including:

S100: mounting the porous cylinders in mounting passages of the flow control valve, respectively;
S200: mounting valve caps provided with the flanges in advance on both sides of the valve body respectively; and
S300: fixedly connecting the flanges with the gas injection channel.

Figure 12:
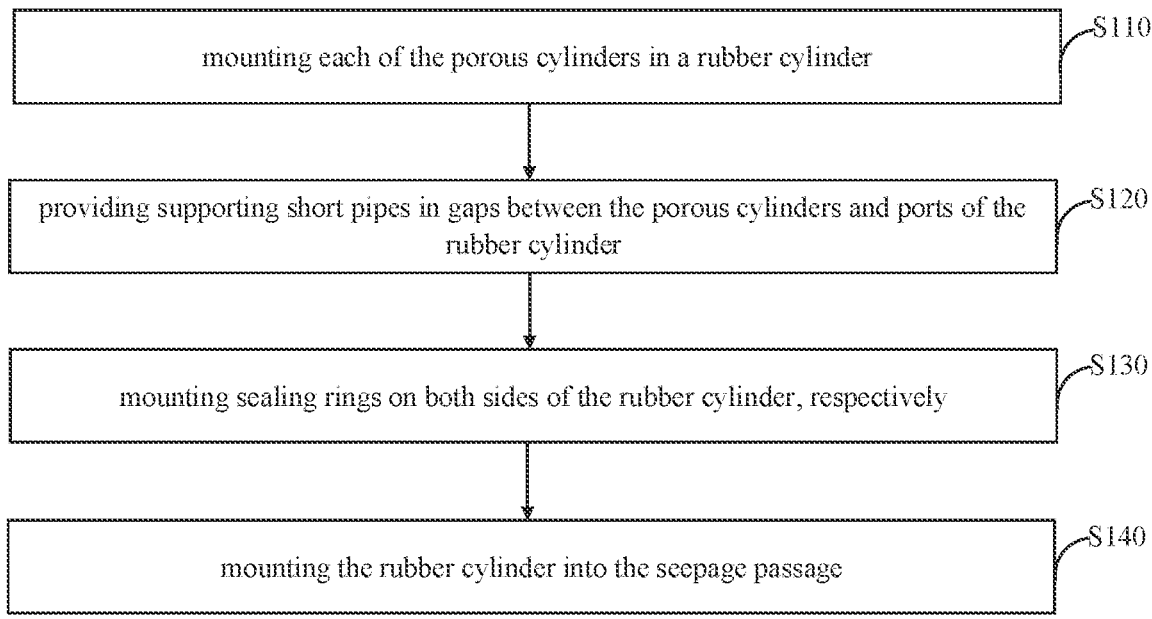
FIG. 12 is a schematic diagram of a flow chart of a step S100 of a method for mounting a gas flow control valve provided in an embodiment of the present application.

In a specific example of the step S100, referring to FIG. 12, the step S100 of the mounting method for the gas flow control valve 2 specifically includes:

S110: mounting each of the porous cylinders in a rubber cylinder;
S120: providing supporting short pipes in gaps between the porous cylinders and ports of the rubber cylinder;
S130: mounting sealing rings on both sides of the rubber cylinder, respectively; and S140: mounting the rubber cylinder into the mounting passage.

Figure 13:
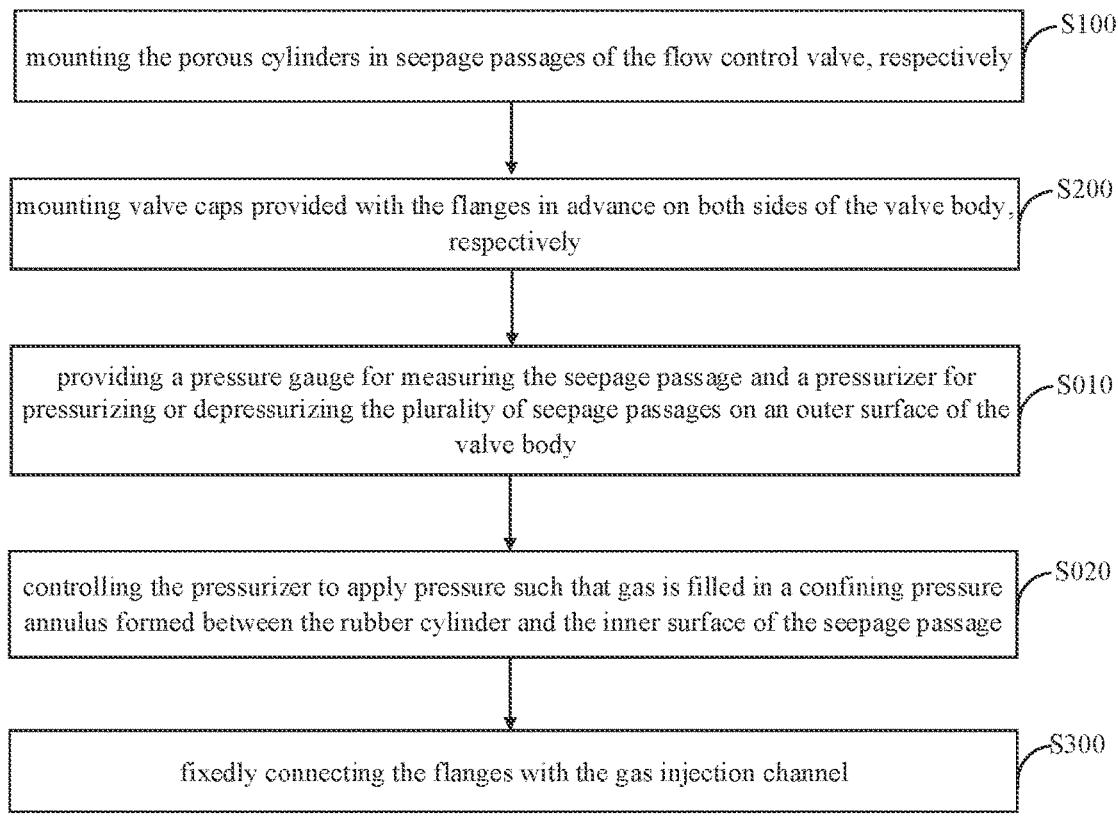
FIG. 13 is a schematic diagram of a flow chart of a method for mounting a gas flow control valve including steps S010 and S020 provided in an embodiment of the present application.

Between the S200 and S300, referring to FIG. 13, the mounting method for the gas flow control valve 2 further specifically includes:

S010: providing a pressure gauge for measuring the mounting passage and a pressurizer for pressurizing or depressurizing the plurality of mounting passages on an outer surface of the valve body;
S020: controlling the pressurizer to apply pressure such that gas is filled in a confining pressure annulus formed between the rubber cylinder and the inner surface of the mounting passage.

Figure 14:
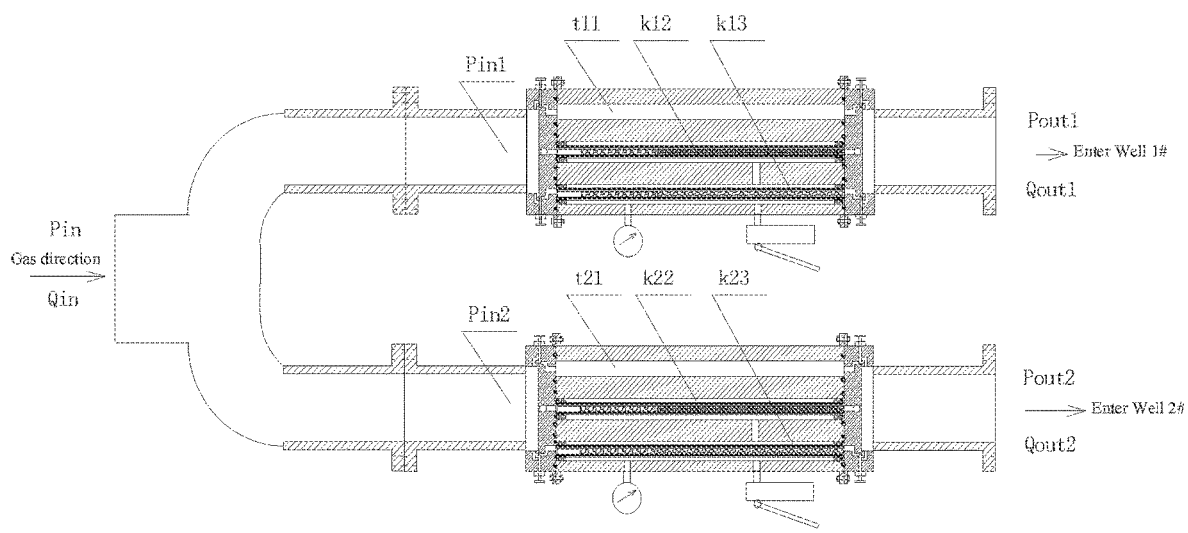
FIG. 14 is a schematic diagram showing the operation of the stable flow control valve provided in an embodiment of the present application.

For example, in FIG. 14, the parameter design of the gas flow control valve 2, the installation of the porous cylinder 1, and the application of the gas flow control valve 2 in the gas injection process will now be introduced.

a. Designing Relevant Parameters of the Gas Flow Control Valve 2

Firstly, a porous cylinder is preferably determined according to a working pressure of 21 MPa. The description parameters of the cylinder are permeability, diameter, and length. Generally, the diameter of the gas flow control valve 2 after processing is fixed, so that only the permeability and the length are preferably determined.

The flow distribution effect of the porous media cylinder with 2 cm diameter is tested in the laboratory.

Figure 15:
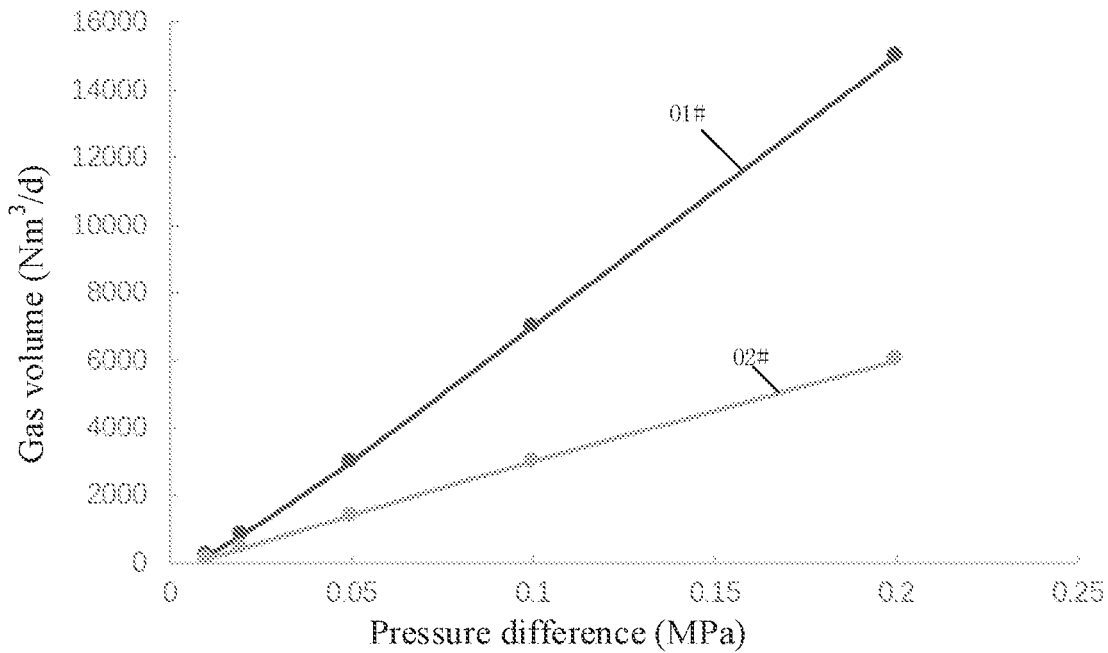
FIG. 15 is a schematic diagram showing the relationship between gas volume and differential pressure for samples with different permeabilities according to an embodiment of the present application.

FIG. 15 shows the relationship between gas volume and pressure difference for samples with a length of 7 cm and different permeabilities.

Figure 16:
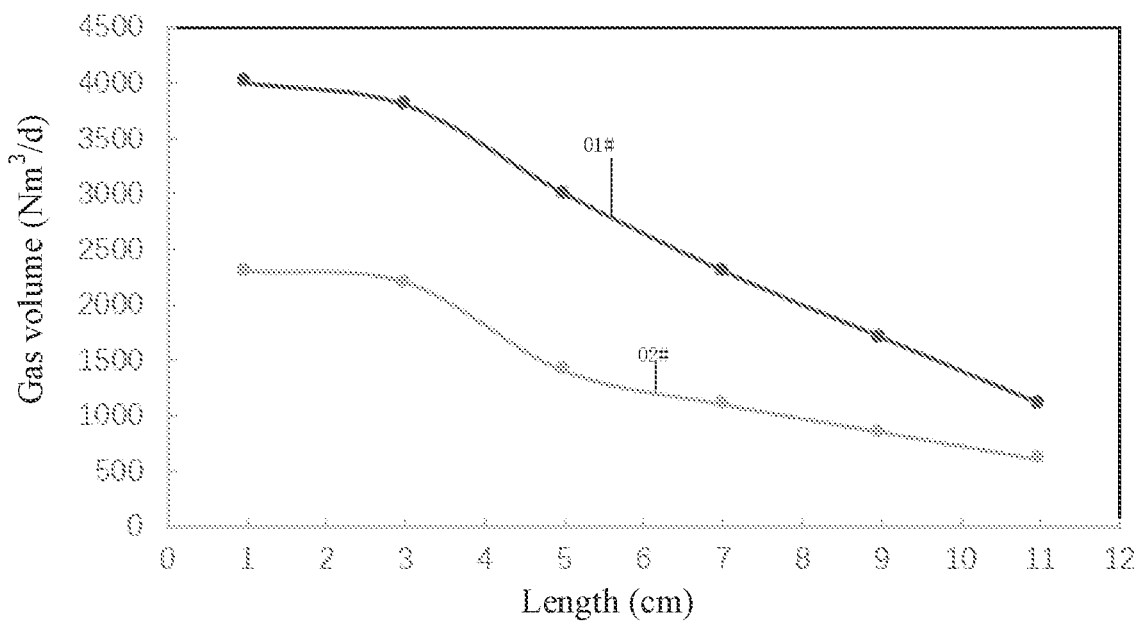
FIG. 16 is a schematic diagram showing the relationship between gas volume and differential pressure for samples with different lengths according to an embodiment of the present application.

FIG. 16 shows the relationship between gas volume and pressure difference for samples with a pressure difference of 0.05 MPa and different lengths.

The test results show that the gas flow rate is stable and the linear rule is obvious under the condition that the pressure difference is greater than 0.02 MPa and the length is greater than 5 cm. Hence, the distributary volume effect of selection of the porous cylinder is shown in Table 3.

TABLE 3

Effect of combination

| Way of combination | Cylinder sample and number | permeability (mD) | length (cm) | pressure difference (MPa) (21 MPa at the outlet) | flow rate (Nm³/d) | flow distribution ratio in parallel |
|---|---|---|---|---|---|---|
| Combination of different permeabilities | 01#-001 | 1000 | 7 | 0.05 | 2800 | about 2:1 |
|  | 02#-002 | 500 | 7 | 0.05 | 1300 |  |
| Combination of different lengths and high permeability | 01#-003 | 1000 | 5 | 0.05 | 3000 | about 2:1 |
|  | 01#-004 | 1000 | 10 | 0.05 | 1550 |  |
| Combination of different lengths and low permeability | 02#-005 | 500 | 5 | 0.05 | 1400 | about 2:1 |
|  | 02#-006 | 500 | 10 | 0.05 | 780 |  | b. Mounting of the Porous Cylinder 1

The sample 01#-003 is installed in the mounting passage k12 of the first flow control valve illustrated in FIG. 14, and the sample 02#-005 is installed in the mounting passage k13 of the first flow control valve illustrated in FIG. 14 (i.e., the upper flow control valve illustrated in FIG. 14);

The sample 01#-004 is installed in the mounting passage k22 of the second flow control valve illustrated in FIG. 14, and the sample 02#-006 is installed in the mounting passage k23 of the second flow control valve illustrated in FIG. 14 (the lower flow control valve illustrated in FIG. 14).

The porous cylinder is installed as below: firstly, the selected cylinder is installed into the rubber cylinder 256, and then the empty space is filled up with the supporting short pipe 259. The sealing rings 257 are installed on both sides of the rubber cylinder respectively. Finally, the whole is put into the corresponding mounting passage.

The valve cap 22 is installed as below: a valve cap 22 with flanges 23 is mounted on both sides of the valve body 21 to ensure that the sealing circles are accurately positioned.

Auxiliary parts are installed as below: a pressure gauge 26 and a pressurizer 27 are installed. After installation, the pressurizer 27 is used to pressurize the confining pressure annulus 258 to 0.1 MPa, so that the confining pressure annulus 258 is filled with gas and the inner parts such as the rubber cylinder 256 are fixed.

c. Application of the Gas Flow Control Valve 2 in the Gas Injection Process

The installed gas flow control valves 2 are connected to the main line and single well line in accordance with FIG. 14.

As can be seen from the above principle analysis and test effect, the total gas injection amount Qin can be realized by different control modes, which is branched into a first branch and a second branch through the gas flow control valve 2, and the corresponding flow rate ratio Qout1:Qout2 approaches 2:1. The total input pressure Pin of the gas injection channel is branched into a first pressure Pin1 and a second pressure Pin2 via the first and second branches, respectively.

In the first step, the passage valves, i.e., a first passage valve t11 and a second passage valve t21, of both of the gas flow control valves 2 are opened when the gas injection is started.

In the second step, after the high-pressure gas compressor runs smoothly (5 min), the valves on both sides of the mounting passage k12 of the first gas flow control valve 2 are opened, and then the valves on both sides of the mounting passage k22 of the two gas flow control valves 2 are opened, and thereafter, the valves on both sides of the first passage valve t11 and the second passage valve t21 are slowly closed. According to theoretical estimation and test experiments, the flow rate ratio Qout1:Qout2 output from the two gas flow control valves 2 approaches 2:1. Obviously, this step may employ a paired combination of the mounting passage k13 and the mounting passage k23.

In the third step, if the output flow ratio deviates significantly from the designed ratio, a combination of multiple channels can be used, and the typical theoretical combination effect is shown in Table 4. When the outlet pressure Pout1 and Pout2 differ greatly, the output ratio in Table 4 changes and can be adjusted flexibly according to the same principle.

TABLE 4

Design effect achievable by multi-channel cooperation (main combination)

| Typical combination | Opening method | Theoretical output ratio Qout1:Qout2 | Applicable conditions |
|---|---|---|---|
| Equal ratio | ① t11, t21 opened ② k13, k22 opened | 1:1 | The single well pressure is basically the same, and the suction capacity is close. ① high flow rate; ② low flow rate |
| Limit ratio | t11, k23 opened | ∞ | One well injection takes up almost all of it |
| Adjustable ratio | k12, k13, k23 opened | 6:1 | — |
| | k12, k13, k22 opened | 3:1 | — |
| | k12, k22 opened | 2:1 | — |
| | . . . | . . . | |

As can be seen from the above description, the porous cylinder, the gas flow control valve and the mounting method for the gas flow control valve provided in the above embodiments of the present application has the following advantages:

1. The method for characterizing the stability of gas seepage solves the problem caused by the "slippage effect" of gas, which can not be applied industrially.
2. By the method for characterizing the stability of gas seepage, the limits of geometric parameters of porous media under different temperature and pressure conditions are determined. Under the condition of constant gas injection pressure and cross section of the cylinder, the limit value of the length of a fixed porous cylinder is determined by taking the length as a variable. This method provides guidance for the application.
3. The gas flow control valve provides an example for application, and is easy to adjust and improve on the basis of the example.
4. The control capability of the gas flow control valve can be adjusted on the one hand by a core with different permeability and on the other hand by the length of the core.

It should be noted that in this text, relational terms are only used to distinguish one entity or operation from another entity or operation, and the existence of any such actual relationship or order between these entities or operations is not necessarily required or implied. Moreover, the term "comprise", "include" or any other variant intends to cover the non-exclusive inclusions, so that a process, a method, a commodity or a device comprising a series of elements comprise not only those elements, but also other elements not explicitly listed, or further comprise inherent elements of such process, method, commodity or device. An element that is defined by the phrase "comprising a . . . " does not exclude the presence of additional elements in the process, method, product, or equipment that comprises the element. The terms "upper", "lower" and the like indicate an orientation or position relationship based on the orientation or position relationship shown in the drawings, merely for convenience of description and simplification of the invention, but do not indicate or imply that the device or element referred to must have a particular orientation, be constructed and operated in a specific orientation, and therefore should not be construed as limiting the invention. The terms "installed", "connected to", "connected" are to be understood in a broad sense unless expressly specified and defined otherwise. For example, the connection may be a fixed connection, a detachable connection or an integrated connection, or may be a mechanical connection or an electrical connection, or may be a direct connection, or may be an indirect connection through an intermediary, or an internal communication between two elements. The specific meanings of the above terms in the present invention may be understood by those ordinarily skilled in the art as the case may be.

Numerous specific details are set forth in the specification of the invention. It is understood, however, the embodiments of the invention may be practiced without these specific details. In some instances, well-known methods, structures, and techniques are not shown in detail so as not to obscure an understanding of the present description. Similarly, it should be understood that in the foregoing description of exemplary embodiments of the present invention, in order to streamline the present disclosure and to aid in understanding one or more of the various inventive aspects, the various features of the invention are sometimes grouped together into a single embodiment, figure, or description thereof. However, the disclosed method should not be construed to reflect the intention that the claimed invention claims more features than that are expressly recited in each claim. More precisely, as reflected in the claims, the inventive aspect resides in less than all of the features of the single embodiment disclosed above. Accordingly, the claims that follows the detailed embodiments are hereby expressly incorporated by reference into the detailed description, wherein each claim itself serves as a separate embodiment of the invention. It should be noted that the embodiments in the present application and the features in the embodiments can be combined with each other without conflict. The invention is not limited to any single aspect, nor to any single embodiment, nor to any combination and/or substitution of these aspects and/or embodiments. Moreover, each aspect and/or embodiment of the invention may be used alone or in combination with one or more other aspects and/or embodiments thereof.

Although the embodiment of the specifications provides the method operation steps as described in the embodiment or the flowcharts, more or less operation steps may be included based on the conventional or non-creative means. The order of the steps listed in the embodiments is merely one of various execution orders of the steps, rather than a unique execution order. At an actual apparatus or a terminal product, the steps may be performed in sequence or in parallel according to the methods illustrated in the embodiments or drawings (e.g., by a parallel processor or under a multi-threaded processing environment and even a distributed data processing environment). The term "comprise", "include" or any other variant intends to cover the non-exclusive inclusions, so that a process, a method, a commodity or a device comprising a series of elements comprise not only those elements, but also other elements not explicitly listed, or further comprise inherent elements of such process, method, commodity or device. In a case where there is no further limitation, it does not exclude other identical elements existing in the process, method, commodity or device comprising the elements.

Finally, it should be noted that the above embodiments are only used to illustrate the technical solution of the present invention, and are not to be construed as limiting the same. Although the present invention has been described in detail with reference to the foregoing embodiments, those of ordinarily skilled in the art will appreciate that the technical solutions described in the above embodiments can still be modified, or some or all of the technical features thereof can be replaced by equivalents. Such modifications and substitutions do not deviate the essence of the corresponding technical solution from the scope of the technical solution of each embodiment of the present invention, and should be included in the scope of the claims and specification of the present invention.

The invention claimed is:

1. A gas flow control valve, comprising a tubular valve body, two valve caps respectively provided at both ends of the valve body, and two flanges respectively provided at both ends of the valve body;
   wherein one side of the flange is communicated with the gas injection channel, and the other side of the flange is connected to the valve cap;
   the valve body is provided therein with a plurality of tubular passages arranged in sequence along the horizontal direction of the valve body, and the tubular passages comprises a pipe flow passage and a plurality of mounting passages;
   a porous cylinder with a porous structure is mounted in each of the mounting passages, and an interior of the porous cylinder forms a seepage passage for stable seepage flow of gas, wherein a Reynolds number for characterizing the flow state of the gas flowing through the seepage passage is a positive number smaller than 2300;
   a plurality of connection channels are provided in the valve cap, one end of each of the connection channels communicates with an interior of each of the tubular passages, and the other end of each of the connection channels is provided respectively with a valve stem, such that the gas in the gas injection channel flows through the connection channel corresponding to the valve stem in an open state, and flows into the tubular passage communicating with the connection channel.

2. The gas flow control valve according to claim 1, wherein there are two porous cylinders, an interior of one of which forms a first seepage passage and an interior of the other of which forms a second seepage passage.

3. The gas flow control valve according to claim 2, wherein the valve body is provided therein with a first mounting passage and a second mounting passage, and the two porous cylinders are mounted in the first mounting passage and the second mounting passage, respectively;
   a communication hole is provided between the first mounting passage and the second mounting passage;
   a pressure measuring hole is provided between the second mounting passage and the valve body, and a pressurization and depressurization hole is provided between the second mounting passage and the valve body.

4. The gas flow control valve according to claim 3, further comprising a pressure gauge and a pressurizer which are provided on an outer surface of the valve body;
   wherein the pressure gauge is connected to the pressure measuring hole, and the pressurizer is connected to the pressurization and depressurization hole.

5. The gas flow control valve according to claim 1, wherein a sealing ring is provided at the connection between a port of the valve body and the valve cap.

6. The gas flow control valve according to claim 1, wherein a rubber cylinder arranged in the length direction of the mounting passage is provided in the mounting passage, and a sealing ring is provided between the rubber cylinder and inner surfaces of both ports of the mounting passage, such that a confining pressure annulus is formed between the rubber cylinder and an inner surface of the mounting passage;

the rubber cylinder is provided therein with supporting short pipes respectively close to two ports of the mounting passage;

the porous cylinder is connected between the two supporting short pipes.

7. The gas flow control valve according to claim 6, wherein a sealing circle is provided on a side of the sealing ring that is close to the port of the mounting passage.

8. A mounting method for a gas flow control valve according to claim 1, comprising:

mounting the porous cylinders in mounting passages of the flow control valve, respectively;

mounting valve caps provided with the flanges in advance on both sides of the valve body, respectively; and fixedly connecting the flanges with the gas injection channel.

9. The mounting method for a gas flow control valve according to claim 8, wherein mounting the porous cylinders in mounting passages of the flow control valve, respectively, comprises:

mounting each of the porous cylinders in a rubber cylinder;

providing supporting short pipes in gaps between the porous cylinders and ports of the rubber cylinder;

mounting sealing rings on both sides of the rubber cylinder, respectively; and mounting the rubber cylinder into the mounting passage.

10. The mounting method for a gas flow control valve according to claim 9, wherein after mounting valve caps provided with the flanges in advance on both sides of the valve body respectively, the mounting method further comprises:

providing a pressure gauge for measuring the mounting passage and a pressurizer for pressurizing or depressurizing the plurality of mounting passages on an outer surface of the valve body;

controlling the pressurizer to apply pressure such that gas is filled in a confining pressure annulus formed between the rubber cylinder and the inner surface of the mounting passage.

* * * * *